United States Patent
Asadullah et al.

(10) Patent No.: US 9,599,976 B2
(45) Date of Patent: Mar. 21, 2017

(54) SYSTEMS AND METHODS FOR EFFECTIVE SELECTION OF DISPARATE DISTRIBUTED POWER SOURCES FOR SMART GRID

(71) Applicant: Infosys Limited, Bangalore (IN)

(72) Inventors: Allahbaksh Mohammedali Asadullah, Hubli (IN); Sunil Kumar Vuppala, Bangalore (IN)

(73) Assignee: Infosys Limited, Bangalore (IN)

(*) Notice: Subject to any disclaimer, the term of this patent is extended or adjusted under 35 U.S.C. 154(b) by 350 days.

(21) Appl. No.: 14/493,875

(22) Filed: Sep. 23, 2014

(65) Prior Publication Data

US 2015/0120069 A1 Apr. 30, 2015

(30) Foreign Application Priority Data

Sep. 23, 2013 (IN) .......................... 4297/CHE/2013

(51) Int. Cl.
*G05F 1/66* (2006.01)
*G05B 15/02* (2006.01)
*H02J 3/00* (2006.01)
*H02J 3/38* (2006.01)

(52) U.S. Cl.
CPC .............. *G05B 15/02* (2013.01); *H02J 3/381* (2013.01); *H02J 2003/007* (2013.01)

(58) Field of Classification Search
CPC ...... G05B 15/02; H02J 3/381; H02J 2003/007
See application file for complete search history.

(56) References Cited

U.S. PATENT DOCUMENTS

| 7,321,834 | B2 * | 1/2008 | Chu ........................... H02J 3/00 307/102 |
| 8,264,100 | B2 * | 9/2012 | Rozman .................... H02J 3/36 307/45 |
| 2008/0028239 | A1 * | 1/2008 | Rapps ..................... G06F 1/263 713/300 |

(Continued)

FOREIGN PATENT DOCUMENTS

WO  2011/112255 A2  9/2011

OTHER PUBLICATIONS

A Heuristic for Two Bin Partition Problem by Asadullah, Allahbaksh M. et al.; 4 pages; Sep. 2014.*

*Primary Examiner* — Ramesh Patel
(74) *Attorney, Agent, or Firm* — LeClairRyan, a Professional Corporation

(57) ABSTRACT

This technology relates to systems and methods for effective selection of disparate distributed power sources for smart grid in near real time manner to meet the specific power demand. Power from the plurality of disparate power sources is received and then one or more power sources among the plurality of disparate power sources are selected based on one or more predefined requirements. At least one effective power source is determined from the one or more power sources by applying one or more algorithm based on number and range of the one or more power sources. The one or more algorithm comprise Complete Karmarkar Karp (CKK), pbrute, Heuristic based pbrute. A signal for selection of the at least one effective power source is generated and the signal is sent to a circuit switcher to supply the power from the at least one effective power sources to the smart grid.

12 Claims, 5 Drawing Sheets

(56) References Cited

U.S. PATENT DOCUMENTS

| | | | |
|---|---|---|---|
| 2010/0274407 A1* | 10/2010 | Creed | H02J 3/14 |
| | | | 700/295 |
| 2011/0007824 A1* | 1/2011 | Bridges | B60L 11/1844 |
| | | | 375/257 |
| 2011/0062786 A1 | 3/2011 | Rozman et al. | |
| 2012/0150679 A1* | 6/2012 | Lazaris | G06Q 30/0605 |
| | | | 705/26.2 |

* cited by examiner

SYSTEMS AND METHODS FOR EFFECTIVE SELECTION OF DISPARATE DISTRIBUTED POWER SOURCES FOR SMART GRID

This application claims the benefit of Indian Patent Application Filing No. 4297/CHE/2013, filed Sep. 23, 2013, which is hereby incorporated by reference in its entirety.

FIELD

This technology generally relates to an effective selection of power sources for smart grid, and in particular, to a system and method for effective selection of disparate distributed power sources for smart grid.

BACKGROUND

A smart grid is an electrical grid that uses information and communications technology to gather and act on information, such as information about the behaviors of suppliers and consumers, in an automated fashion to improve the efficiency, reliability, economics, and sustainability of the production and distribution of electricity. Various Demand Response programs offer incentives to electricity users to reduce their power use in response to a utility's need for power due to a high, system-wide demand for electricity or emergencies that could affect the transmission grid. In Smart Grid, the demand response is adjusting the load as per the supply variations. The present demand response programs by various utility companies are following different strategies such as few of them inform customers about the peak pricing and customer at their end reduce the consumption of power to enjoy benefits from utility companies. In an another instance, the utility companies have control on the smart thermostats for high energy consuming appliances with some incentives to the customers by participating in the demand response programs. In yet another instance, distributed renewable energy (DRE) is present at customer premises which contributes to the demand response program. In the concept of micro grid, the customer has a choice to send excess renewable energy back to the grid due to availability of two way communication. All the above mentioned instances brings a basic problem of selection from utility side in the system from the stability point of view in near real time which includes selection of appropriate energy source to obtained the required amount of energy to meet the specific demand. Majority of the time the amount of the energy which can enter the main Grid or smart grid is defined by some policy or the demand which makes difficult to select the power provider as the power is provided by different providers is not same. Some may provide at W1 and some other may provide at Wn power to the grid based on the time at which it is inputting the power to the grid. In a case wherein the number of providers are many and provides different amounts of power, it becomes difficult to select which among N number of providers will sum up to the required power demand. Yet another problem is matching the supply demand in power grid. The problem becomes complex due to customer participation, renewable energy sources at customer premises, distributed generation from disparate or similar power sources and availability of two way communication. The existing technologies limit in terms of providing solution in near real time for selection of resources to meet the specific demand.

In view of the foregoing discussion, there is a need for a method and system to provide solution in near real time for selection of power sources to meet the specific demand.

SUMMARY

This technology by way of example only overcomes the limitation mentioned above by applying one or more algorithm based on number and range of the one or more power sources, wherein the one or more algorithm comprise Complete Karmarkar Karp (CKK), pbrute, Heuristic based pbrute which selects the power in near real time.

According to one example, a method implemented by one or more computing devices, for selecting at least one effective power source among a plurality of disparate power sources for a smart grid is disclosed. It involves receiving power from the plurality of disparate or similar power sources and then selecting one or more power sources among the plurality of disparate power sources based on one or more predefined requirements then determining, by the processor, at least one effective power source from the one or more power sources by applying one or more algorithm based on number and range of the one or more power sources, wherein the one or more algorithm comprise Complete Karmarkar Karp (CKK), pbrute, Heuristic based pbrute. Thereafter, a signal is generated for selection of the at least one effective power source. Finally, the signal is send to a circuit switcher to supply the power from the at least one effective power sources to the smart grid.

In another example, a system for effective selection of disparate power sources in smart grid is disclosed. The system includes a power receiving module, a power source selection module, an effective power source determination module, a signal generation module and a signal sending module. The power receiving module configured to receive power from the plurality of disparate power sources. The power source selection module configured to select one or more power sources among the plurality of disparate power sources based on one or more predefined requirements. The effective power source determination module configured to select at least one effective power source from the one or more power sources by applying one or more algorithm based on number and range of the one or more power sources, wherein the one or more algorithm comprise Complete Karmarkar Karp (CKK), pbrute, Heuristic based pbrute or similar algorithms. The signal generation module configured to generate a signal for selection of the at least one effective power source. The signal sending module configured to send the signal to a circuit switcher to supply the power from the at least one effective power sources to the smart grid.

In yet another example, a non-transitory computer readable media for selecting at least one effective power source among a plurality of disparate power sources for a smart grid is disclosed. This includes a non-transitory computer usable medium having a computer readable program code embodied therein for selecting at least one effective power source among a plurality of disparate power sources for a smart grid. The computer program code adapted to receiving power from the plurality of disparate power sources, selecting one or more power sources among the plurality of disparate power sources based on one or more predefined requirements then determining at least one effective power source from the one or more power sources by applying one or more algorithm based on number and range of the one or more power sources, wherein the one or more algorithm comprise Complete Karmarkar Karp (CKK), pbrute, Heuristic based pbrute, thereafter generating a signal for selection of the at least one effective power source, and finally sending the signal to a circuit switcher to supply the power from the at least one effective power sources to the smart grid.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present technique provides a system and method for effective selection of disparate distributed power sources for smart grid in near real time manner to meet the specific power demand. The technique involves receiving power from the plurality of disparate power sources then selecting one or more power sources among the plurality of disparate power sources based on one or more predefined requirements thereafter determining at least one effective power source from the one or more power sources by applying one or more algorithm based on number and range of the one or more power sources, wherein the one or more algorithm comprise Complete Karmarkar Karp (CKK), pbrute, Heuristic based pbrute or similar algorithm and then generating a signal for selection of the at least one effective power source and finally sending the signal to a circuit switcher to supply the power from the at least one effective power sources to the smart grid.

Figure 1:
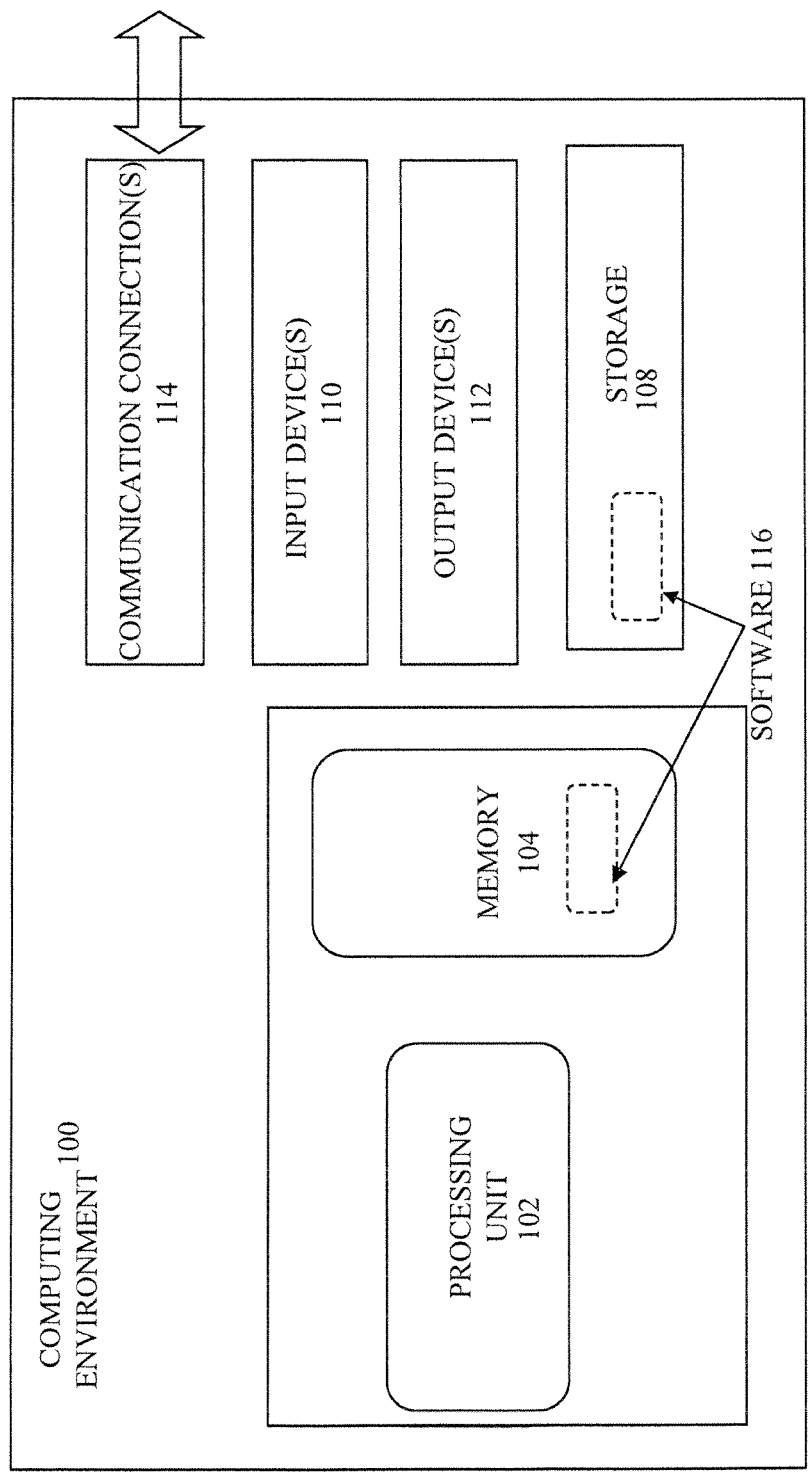
FIG. 1 is a computer architecture diagram illustrating an example of a power management computing device configured to be capable of implementing examples of the technology presented herein.

FIG. 1 illustrates a generalized example of a suitable power management computing device 100 or other computing environment in which embodiments, techniques, and technologies of this claimed invention may be implemented. The power management computing device 100 is not intended to suggest any limitation as to scope of use or functionality of the technology, as the technology may be implemented in other types and/or numbers of computing devices. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the power management computing device 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the power management computing device 100 includes storage 108, one or more input devices 110, one or more output devices 112, and one or more communication connections 114. An interconnection mechanism (not shown) such as a bus, a controller, or a network, interconnects the components of the power management computing device 100. Typically, operating system software (not shown) provides an operating environment for other software executing in the power management computing device 100, and coordinates activities of the components of the power management computing device 100.

Figure 2:
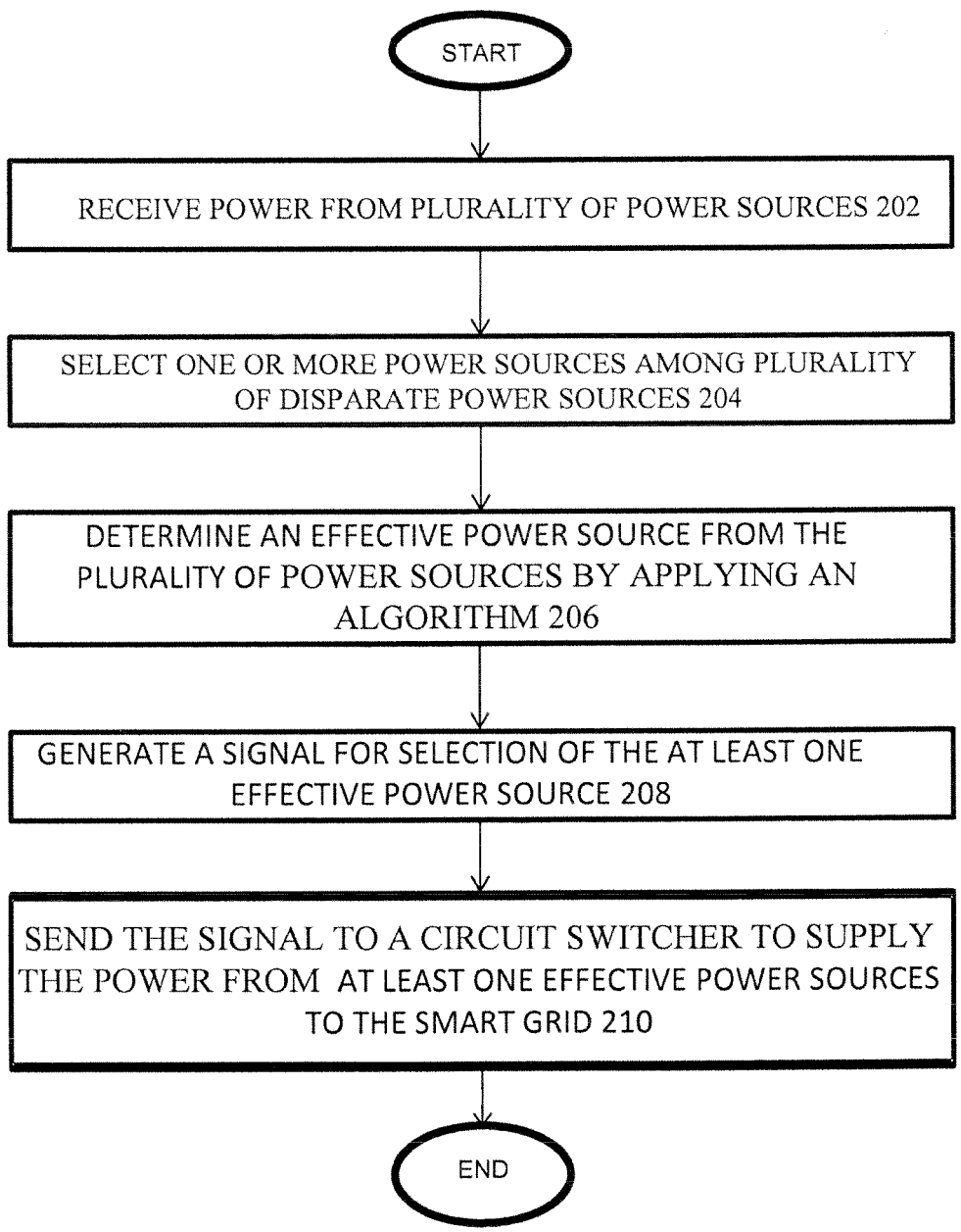
FIG. 2 is a flowchart, illustrating an example of a method for selecting at least one effective power source among a plurality of disparate power sources for a smart grid, in accordance with an example of the present technique.

FIG. 2 is a flowchart, illustrating an example of a method for selecting at least one effective power source among a plurality of disparate power sources for a smart grid, in accordance with an example of the present technique. The power is received from plurality of disparate power sources 202. Then, one or more power sources are selected based on one or more predefined requirements 204 wherein the predefined requirements comprises frequency, power sources, rebate or combination thereof. Thereafter, at least one effective power source is determined 206 from the one or more power sources by applying one or more algorithm based on number and range of the one or more power sources, wherein the one or more algorithm comprise Complete Karmarkar Karp (CKK), pbrute, Heuristic based pbrute. In an exemplary embodiment of the invention for real time selection of power source from the plurality of power sources, the Karmakar Karp (KK) and Complete Karmarkar Karp (CKK) Algorithms are applied. The KK algorithm is heuristic algorithm and give approximate results whereas KK algorithm take only NlogN computing resources however CKK give best solution by take $2^N$ time hence total solution generated by CKK are $2^{(N-1)}$. The invention use KK, CKK and improvements of both, different value of N and in different ranges and distribution. The algorithms are selected based on the input type and compute the heuristic result in specified time.

The Karmakar Karp and Complete Karmakar Karp are applied based on factors like value of N (which number of feeder back to grid), value of highest amount of power back to grid, kind of distribution of all inputs (Exponential, Normal, Step, Uniform) wherein N is number of suppliers, N1, N2, N3, are power supplied quantities and range is value of largest ni. In order to find out a total power supply back to power supply (S), the power is supplied from all the sources if demand is more than supply. If value of N<30 then CKK is applied. Else if value of N<60, then PBrute is applied. Else if Value of N>60 then Heuristic based PBrute is applied. Else if Value of N>150 then is applied CKK in order to get results. In an instance if power needed is D and available power is S. The difference of power is X=S−D. Hence, a branch in CKK is taken either which leads to Sum as D, or S−D. If N<30 is applied then It is sure that it is achieved in real time however if N<60 is applied but N>30 its time complexity is very high. Similarly, for N<60, compromise is on memory and get the same time complexity as delivered by N<30. For N>60 a heuristic is applied which may miss out optimal selection and also many other solutions (as there can be more than one solution which exists). For N>150 a CKK can be used and KK can be used for N>>150. CKK and KK robustness is used to prove to get near optimal solution in near real time. The detailed approach is described herein below with reference to FIG. 4 and FIG. 5.

Thereafter, a signal is generated for selection of the at least one effective power source 208. Finally, the signal is sent to a circuit switcher to supply the power from the at least one effective power sources to a smart grid 210. The determination of algorithm 206 is based on an input type.

Figure 3:
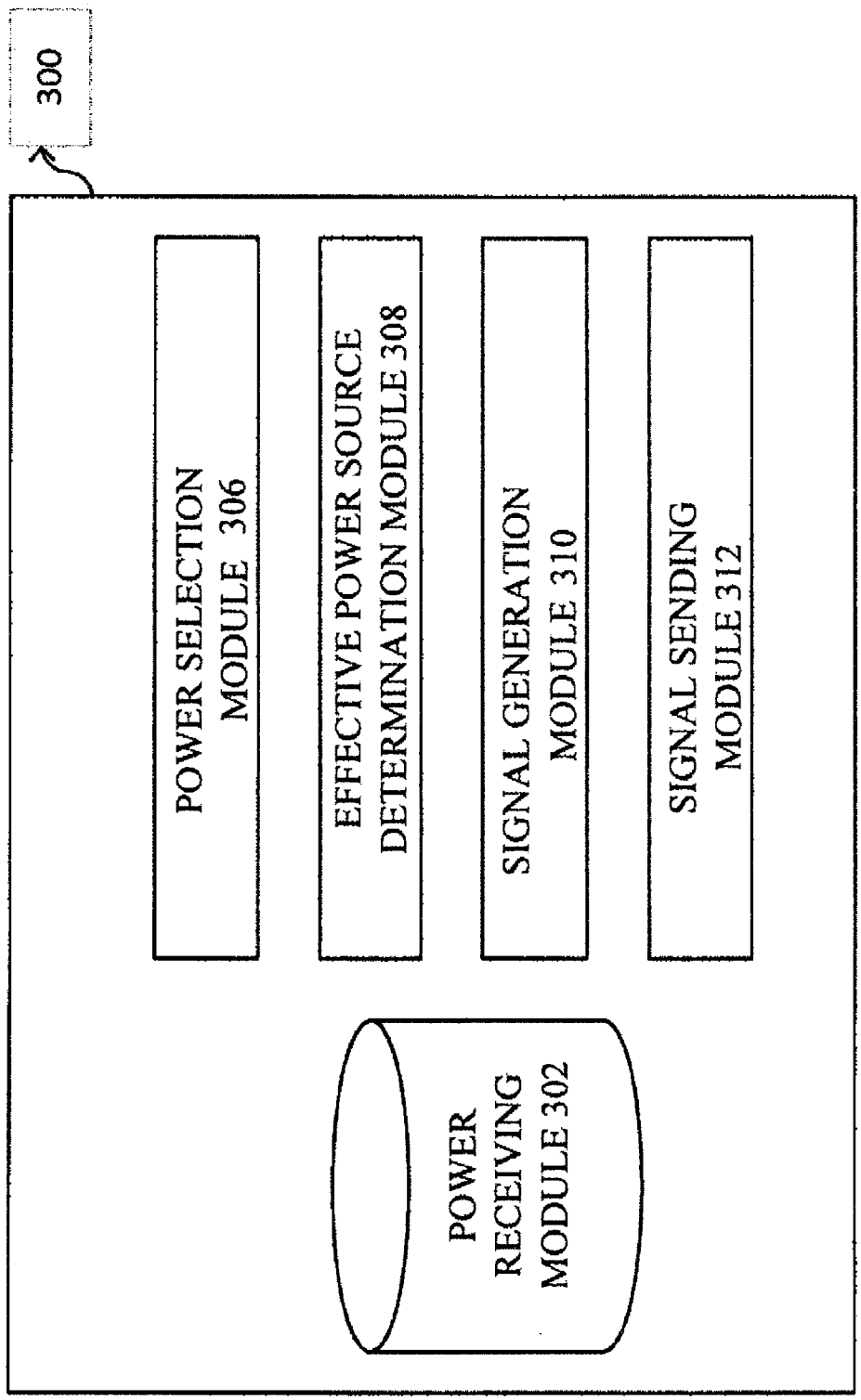
FIG. 3 is a block diagram illustrating an example of a system for selecting at least one effective power source among a plurality of disparate power sources for a smart grid, in accordance with an example of the present technique.

FIG. 3 is a block diagram illustrating a system for selecting at least one effective power source among a plurality of disparate power sources for a smart grid, in accordance with an example of the present technique. More particularly, the system includes a power receiving module 302, a power selection module 306, an effective power source determination module 308, a signal generation module 310 and a signal sending module 312. A power receiving module 302 receives power from the plurality of disparate power sources. Thereafter, the power source selection module 306 selects one or more power sources among the plurality of disparate power sources based on one or more predefined requirements. Then, the effective power source determination module 308 determines at least one effective power source from the one or more power sources by applying one or more algorithm based on number and range of the one or more power sources, wherein the one or more algorithm comprise Complete Karmarkar Karp (CKK), pbrute, Heuristic based pbrute. Thereafter, the signal generation module 310 configured to generate a signal for selection of the at least one effective power source and finally, the signal sending module 312 sends the signal to a circuit switcher to supply the power from the at least one effective power sources to the smart grid.

Figure 4:
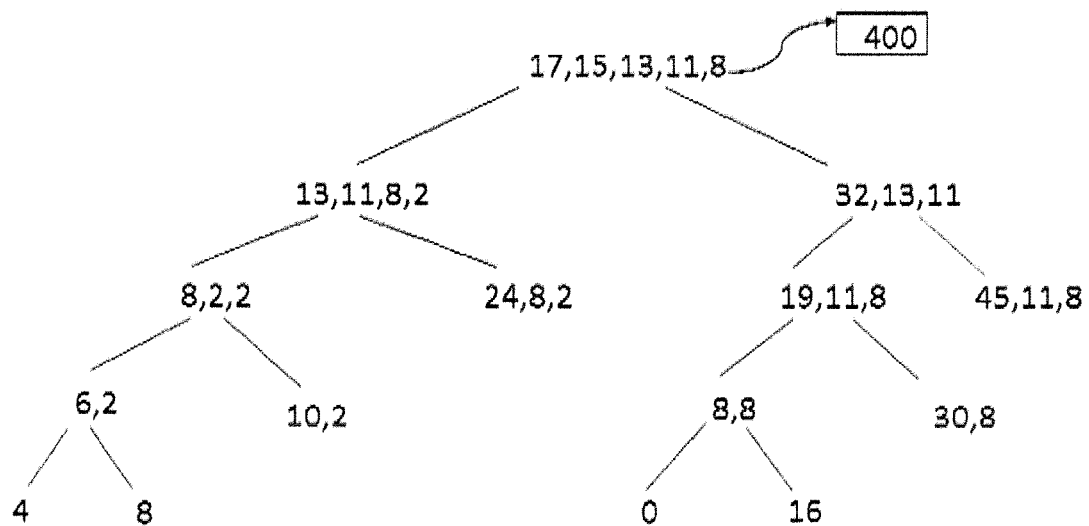
FIG. 4 is an exemplary representation of CKK approach in accordance with an example of the present technique.

FIG. 4 is an exemplary representation of CKK approach 400 in accordance with an example of the present technique.

In an instance wherein power sources with {17, 15, 13, 11, 8} MW and required power supply is 32 MW then CKK approach would be applied.

In CKK approach 400, a tree is build and thereafter a one or more power sources or combination are selected which can supply exactly 32 MW.

The power is selected by building below table:

TABLE 1

| 17, 15 | 13, 11, 8 |
| 32 | 13, 11, 8 |
| 19 | 11, 8 |
| 8 | 8 |

Hence either 17,15 or 13, 11, 8 can be chosen subject to other parameters such as reliability of the power source, distance etc.

Figure 5:
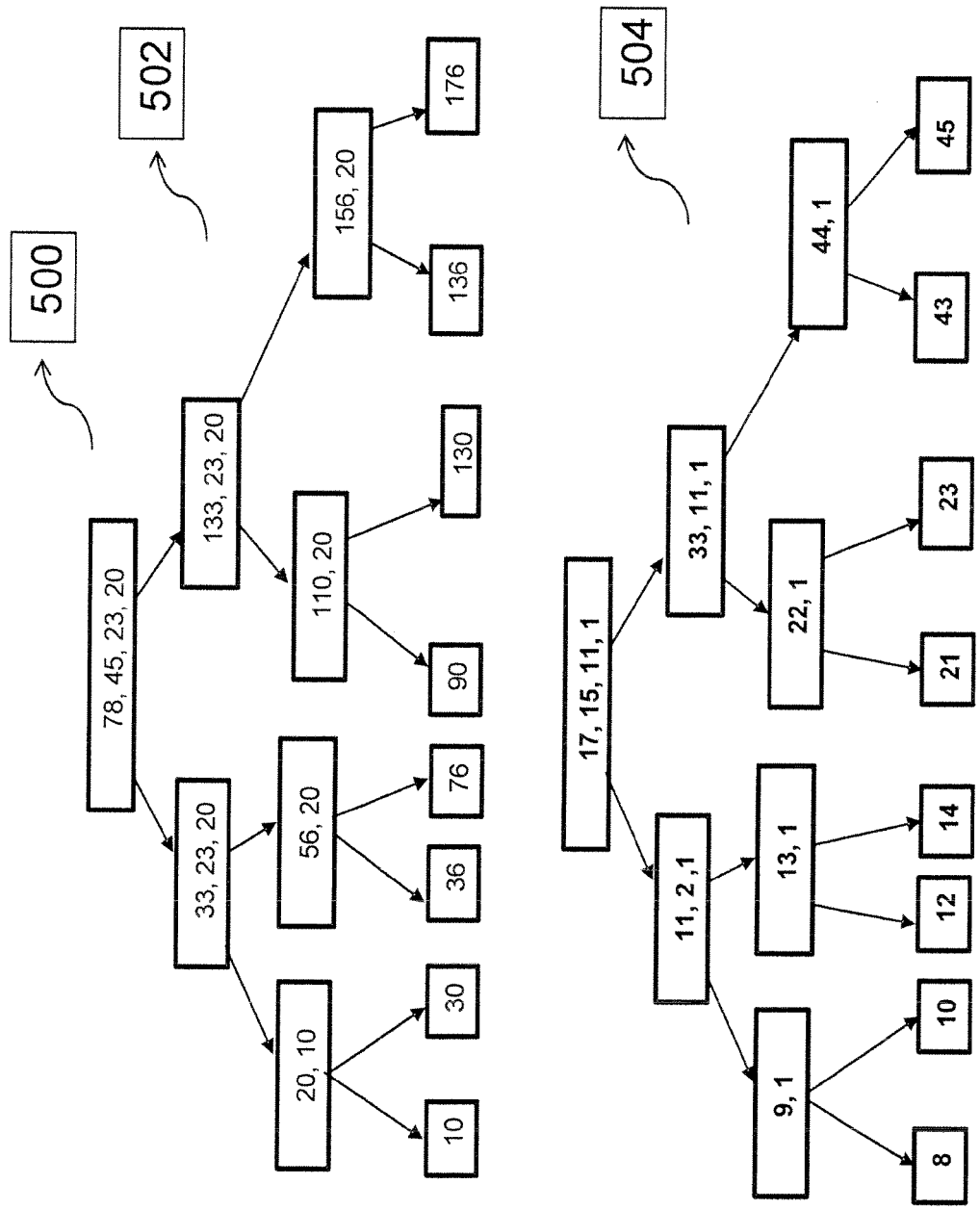
FIG. 5 is an exemplary representation of heuristic based pbrute in accordance with an example of the present technique.

FIG. 5 is an exemplary representation of pbrute, Heuristic based pbrute 500, in accordance with an example of the present technique.

For scenario N=16.

Consider a set S={910; 829; 815; 792; 694; 596; 568; 438; 374; 354; 176; 165; 129; 78; 45; 15} these are power sources The Power Range R=910 and the number of sources are N=16.

Applying KK algorithm to the set S.
910; 829; 815; 792; 694; 596; 568; 438; 374; 354; 176; 165; 129; 78; 45; 15
815; 792; 694; 596; 568; 438; 374; 354; 176; 165; 129; 81; 78; 45; 15
694; 596; 568; 438; 374; 354; 176; 165; 129; 81; 78; 45; 23; 15
568; 438; 374; 354; 176; 165; 129; 98; 81; 78; 45; 23; 15
374; 354; 176; 165; 130; 129; 98; 81; 78; 45; 23; 15
176; 165; 130; 129; 98; 81; 78; 45; 23; 20; 15
130; 129; 98; 81; 78; 45; 23; 20; 15; 11
98; 81; 78; 45; 23; 20; 15; 11; 1
78; 45; 23; 20; 17; 15; 11; 1

KK is stopped at set difference at |S|=8 because the probability of finding a perfect partition for Range 78 is 0.8 at N=8. These numbers are arrived based on the many experiments.

S1={78; 45; 23; 20; } S2={17; 15; 11; 1}

Then, a partitioned brute force is applied on these power sources. Then a tree is constructed and step of KK is followed at each stage wherein FIG. 5 represents part-1 502 and part-2 504 of the sub tree.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for selecting at least one effective power source among a plurality of disparate power sources for a smart grid, the said method comprising:
receiving, by a power management computing device, power from the plurality of disparate power sources;

selecting, by the power management computing device, one or more power sources among the plurality of disparate power sources based on one or more predefined requirements;

determining, by the power management computing device, at least one effective power source from the one or more power sources by applying one or more algorithm based on number and range of the one or more power sources, wherein the one or more algorithm comprise Complete Karmarkar Karp (CKK), pbrute, Heuristic based pbrute;

generating, by the power management computing device, a signal for selection of the at least one effective power source; and sending, by the power management computing device, the signal to a circuit switcher to supply the power from the at least one effective power sources to the smart grid.

2. The method as claimed in claim 1 further comprises reapplying, by the power management computing device, the one or more algorithm in case of disturbance in the power.

3. The method as claimed in claim 1 further comprises applying, by the power management computing device, one or more predefined configurable filters at receiving end of the plurality of disparate power sources.

4. The method as claimed in claim 1 wherein the one or more predefined requirements comprises frequency, power sources, rebate or combination thereof.

5. A power management computing device comprising:
a processor;
a memory coupled to the processor which is configured to be capable of executing programmed instructions comprising and stored in the memory to:
receive power from the plurality of disparate power sources;
select one or more power sources among the plurality of disparate power sources based on one or more predefined requirements;
determine at least one effective power source from the one or more power sources by applying one or more algorithm based on number and range of the one or more power sources, wherein the one or more algorithm comprise Complete Karmarkar Karp (CKK), pbrute, Heuristic based pbrute;
generate a signal for selection of the at least one effective power source; and
send the signal to a circuit switcher to supply the power from the at least one effective power sources to the smart grid.

6. The device as claimed in claim 5 wherein the processor coupled to the memory is further configured to be capable of executing the programmed instructions further comprising and stored in the memory to reapply the one or more algorithm in case of disturbance in the power.

7. The device as claimed in claim 5 wherein the processor coupled to the memory is further configured to be capable of executing the programmed instructions further comprising and stored in the memory to apply one or more predefined configurable filters at receiving end of the plurality of disparate power sources.

8. The device as claimed in claim 5 wherein the one or more predefined requirements of comprises frequency, power sources, rebate and combination thereof.

9. A non-transitory computer readable medium having stored thereon instructions for extracting cross language dependencies and estimating code change impact in software comprising machine executable code which when executed by at least one processor, causes the at least one processor to perform steps comprising:
receiving power from the plurality of disparate power sources;
selecting one or more power sources among the plurality of disparate power sources based on one or more predefined requirements;
determining at least one effective power source from the one or more power sources by applying one or more algorithm based on number and range of the one or more power sources, wherein the one or more algorithm comprise Complete Karmarkar Karp (CKK), pbrute, Heuristic based pbrute;
generating a signal for selection of the at least one effective power source; and
sending the signal to a circuit switcher to supply the power from the at least one effective power sources to the smart grid.

10. The medium as claimed in claim 9 further comprises reapplying the one or more algorithm in case of disturbance in the power.

11. The medium as claimed in claim 9 further comprises applying one or more predefined configurable filters at receiving end of the plurality of disparate power sources.

12. The medium as claimed in claim 10 wherein the one or more predefined requirements comprises frequency, power sources, rebate and combination thereof.

* * * * *